United States Patent
Black et al.

(10) Patent No.: US 12,008,608 B2
(45) Date of Patent: Jun. 11, 2024

(54) PROVIDING PERSONALIZED ITEM RECOMMENDATIONS DURING IN-STORE SHOPPING EXPERIENCE

(71) Applicant: Target Brands, Inc., Minneapolis, MN (US)

(72) Inventors: Clayton Black, Minneapolis, MN (US); Katlyn Temple, Minneapolis, MN (US); Craig Servin, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 97 days.

(21) Appl. No.: 17/103,312

(22) Filed: Nov. 24, 2020

(65) Prior Publication Data

US 2021/0166283 A1 Jun. 3, 2021

Related U.S. Application Data

(60) Provisional application No. 62/943,079, filed on Dec. 3, 2019.

(51) Int. Cl.
*G06Q 30/0282* (2023.01)
*G06Q 30/0601* (2023.01)

(52) U.S. Cl.
CPC ..... *G06Q 30/0282* (2013.01); *G06Q 30/0631* (2013.01); *G06Q 30/0633* (2013.01); *G06Q 30/0639* (2013.01); *G06Q 30/0643* (2013.01)

(58) Field of Classification Search
None
See application file for complete search history.

(56) References Cited

U.S. PATENT DOCUMENTS 2,010,003 A * 8/1935 Becker ..................... C10K 1/00
423/238
8,489,112 B2 7/2013 Roeding et al.
(Continued)

FOREIGN PATENT DOCUMENTS

| WO | 2011/059998 | 5/2011 |
| WO | 2015/103020 | 7/2015 |
| WO | 2018/201205 | 11/2018 |

OTHER PUBLICATIONS

"Barneys Brings iBeacons and Endless Aisles to New York Flagship" [Date Apr. 28, 2016] Retrieved from the internet from <<https://www.retailtouchpoints.com/features/news-briefs/barneys-brings-ibeacons-and-endless-aisles-to-new-york-flagship>> on Jul. 28, 2023 (Year: 2016).*

(Continued)

*Primary Examiner* — Laura Yesildag
*Assistant Examiner* — Rashida R Shorter
(74) *Attorney, Agent, or Firm* — Barnes & Thornburg LLP

(57) ABSTRACT

In some implementations, a method performed by data processing apparatuses includes receiving an indication of interest in an item being presented to a user by an online shopping interface. Data that represents the indication of user interest in the item is stored with data that represents indications of user interest in other items. In response to determining that the user is located within a physical store, (Continued)

the stored data that represents indications of user interest in the items is accessed, items that are available from the physical store are ranked, and one or more of the ranked items are provided for presentation to the user.

9 Claims, 9 Drawing Sheets

(56) References Cited

U.S. PATENT DOCUMENTS

| | | | | |
|---|---|---|---|---|
| 2008/0040341 | A1* | 2/2008 | York | G06Q 30/02 707/999.005 |
| 2010/0183132 | A1 | 7/2010 | Satyavolu et al. | |
| 2011/0178863 | A1 | 7/2011 | Daigle | |
| 2011/0225068 | A1* | 9/2011 | Figueroa | G06F 16/29 701/533 |
| 2012/0239504 | A1* | 9/2012 | Curlander | G06Q 30/02 705/14.66 |
| 2013/0124362 | A1* | 5/2013 | Katcher | G06Q 30/0633 705/26.8 |
| 2013/0297422 | A1 | 11/2013 | Hunter et al. | |
| 2014/0006155 | A1 | 1/2014 | Ramirez et al. | |
| 2014/0095285 | A1 | 4/2014 | Wadell et al. | |
| 2014/0214600 | A1 | 7/2014 | Argue et al. | |
| 2014/0279222 | A1* | 9/2014 | Lampert | G06Q 30/0222 705/26.62 |
| 2015/0112826 | A1* | 4/2015 | Crutchfield, Jr. | G06Q 30/0643 705/26.1 |
| 2015/0269600 | A1 | 9/2015 | Randle | |
| 2016/0343032 | A1 | 11/2016 | DeWitt et al. | |
| 2016/0371735 | A1 | 12/2016 | Walden | |
| 2016/0371766 | A1* | 12/2016 | Schmidt | G06Q 30/0633 |
| 2017/0270574 | A1 | 9/2017 | Hessurg | |
| 2018/0089736 | A1* | 3/2018 | Raravi | G06Q 30/0261 |
| 2018/0336597 | A1 | 11/2018 | Singh et al. | |
| 2018/0345129 | A1 | 12/2018 | Rathod | |
| 2019/0187864 | A1* | 6/2019 | Yeh | G06F 3/0482 |
| 2020/0005356 | A1* | 1/2020 | Greenberger | H04M 1/72457 |

OTHER PUBLICATIONS

"Beacon Marketing 101: How Today's Top Retail Brands Attract Customers with Proximity Marketing" [Sep. 20, 2018] Retrieved from the internet from <<https://web.archive.org/web/20191015193101/https://clevertap.com/blog/beacon-marketing/>> on Jul. 24, 2023 (Year: 2018).*

"Proximity Marketing Examples: 28 Retail Companies Nailing it with their Campaigns" [Feb. 25, 2016] Retrieved from the internet from <<https://web.archive.org/web/20190527033452/https://blog.beaconstac.com/2016/02/25-retailers-nailing-it-with-their-proximity-marketing-campaigns/>> on Jul. 28, 2023 (Year: 2016).*

"Barneys Brings iBeacons and Endless Aisles to New York Flagship" [Date May 2, 2016] Retrieved from the internet from <<https://www.retailtouchpoints.com/features/news-briefs/barneys-brings-ibeacons-and-endless-aisles-to-new-york-flagship>> on Mar. 14, 2024 (Year: 2016) (Year: 2016).*

U.S. Appl. No. 12/942,970, filed Nov. 9, 2010, Grainger et al.
U.S. Appl. No. 13/792,762, filed Mar. 11, 2013, Grainger et al.
U.S. Appl. No. 14/284,336, filed May 21, 2014, Robbin et al.
U.S. Appl. No. 14/288,308, filed May 17, 2014, Mayor.
U.S. Appl. No. 14/500,028, filed Sep. 29, 2014, Gedikian.
U.S. Appl. No. 14/500,683, filed Sep. 29, 2014, Keithley.
U.S. Appl. No. 14/501,611, filed Sep. 30, 2014, Mayor et al.
U.S. Appl. No. 14/586,489, filed Dec. 30, 2014, Vigier et al.
U.S. Appl. No. 14/586,571, filed Dec. 30, 2014, Vigier et al.
U.S. Appl. No. 14/592,638, filed Jan. 8, 2015, Vigier et al.
U.S. Appl. No. 14/673,704, filed Mar. 30, 2015, Grainger et al.
U.S. Appl. No. 14/679,680, filed Apr. 6, 2015, Vigier et al.
U.S. Appl. No. 15/234,886, filed Aug. 21, 2014, Aisaka et al.
Costanza, David: IoT and Retail: "Customer Digital Identity Through Tagmate", Oct. 31, 2017, 8 pages.

* cited by examiner

PROVIDING PERSONALIZED ITEM RECOMMENDATIONS DURING IN-STORE SHOPPING EXPERIENCE

CROSS-REFERENCE TO RELATED APPLICATIONS

This application claims the benefit of U.S. Provisional Application Ser. No. 62/943,079, filed Dec. 3, 2019. The disclosure of the prior application is considered part of (and is incorporated by reference in) the disclosure of this application.

TECHNICAL FIELD

This specification generally relates to determining, providing, and presenting personalized recommendations for items located in a physical space, such as a physical retail store.

BACKGROUND

Retailers often provide product recommendations, such as product offers and promotions, to customers through physical and digital mechanisms. For example, retailers in a physical store may advertise product offers and promotions through signs, placards, and in-store displays that are presented to all customers within the store. Similarly, digital advertising can be used to present product recommendations to customers who are looking up product information online and/or browsing in an online store. Some retailers may operate online stores and brick-and-mortar stores. Online stores allow customers to buy goods from the retailer over the Internet, and the goods are generally shipped to the customers. In general, online stores may track customer purchases and provide recommendations for possible future purchases through the online stores.

Customers can visit brick-and-mortar stores to physically shop for and purchase goods from a retailer. Digital shopping lists on smartphones can help users organize and complete shopping trips in brick-and-mortar stores. Some digital shopping list applications may include in-application advertisements, through which retailers can run promotional offers.

SUMMARY

This document generally describes computer systems, processes, program products, and devices for determining, providing, and presenting personalized recommendations for items located in a physical space (e.g., a store), which can be presented on user mobile computing devices (e.g., smartphones, smart watches) at relevant times/locations within the physical space. For example, a user may have expressed interest in various products that are sold in a physical store, such as through electronic shopping behavior (e.g., placing items to digital shopping list, adding items to virtual cart in online retail store), historical purchases (e.g., products previously purchased in physical and/or retail store), and/or other indicators of interest. These indicators of interest can be evaluated to identify specific product recommendations (e.g., product reminders, product offers) to present when the user approaches, enters, and/or moves around a physical retail store. For example, a user's mobile computing device can present personalized offers for products that the user has previously expressed interest in (e.g., added products to virtual shopping cart in online store) at relevant times and/or locations within the retail store, such as when the user enters the retail store and/or when the user has moved to a location within the store that is at or near areas of the store where the recommended products are stocked/sold.

Such product recommendations may not be presented to all users, and may be selectively presented to subsets of users who are selected based on, for example, their previous expressed interest in the corresponding products. For example, a product offer (example product recommendation) may not be physically attached to a corresponding product within the store, and may instead be presented on mobile devices to particular users who are determined to have expressed interested in that product. Interest can be determined, for example, through actions by the user, which may explicitly and/or implicitly identify an intent/interest in purchasing the product. Examples of such actions related to a product can include, for instance, adding the product to a digital shopping list, identifying the product as a favorite in an online shopping environment, adding the product to an online shopping cart, previously purchasing a product in an online and/or physical store, viewing a product in an online store, scanning a barcode for a product via a mobile device, and/or other actions.

The personalized item recommendations can be based on various factors, such as prior online interactions with items (e.g., purchases of products in online stores, adding products to one or more online lists, viewing product pages, etc.), adding items to digital shopping lists, historical item purchases (e.g., in-store and/or online), cohort interactions with items (e.g., customers having similar profiles having interacted with items), and other suitable factors. In general, the personalized item recommendations can be presented to a customer (e.g., on a mobile computing device operated by the customer) at opportune times during the customer's shopping trip, such as at when the customer enters the store and/or when the customer is located near the item.

Coordinating online and brick-and-mortar shopping experiences can be challenging, for example, because the computing devices, applications, and data sources used to facilitate online shopping may be different from the computing devices, applications, and data sources used to facilitate shopping within brick-and-mortar stores. For example, a mobile shopping application (e.g., an electronic coupon application, a digital shopping list, etc.) executed by a customer's mobile computing device may fail to take into account the customer's online shopping activity, whereas an online store may fail to take into account the customer's experiences and purchases within a brick-and-mortar counterpart to the online store. The disclosed technology can provide techniques for coordinating online and brick-and-mortar shopping experiences through the use of stored online interaction data for various items, location data that indicates the locations of items within the brick-and-mortar store, and customer location data, to provide customers with appropriate item information at opportune times and locations.

For example, during an online shopping session at an online store, a customer may interact with various items (e.g., products, goods) in various ways, such as browsing items, adding items to a favorites list, adding items to an online shopping cart, adding items to a save for later list, and so forth. A brick-and-mortar store that is a counterpart of the online store, for example, may offer many of the same items offered by the online store. While shopping at the brick-and-mortar store, for example, the customer can employ a mobile shopping application (e.g., a digital shopping guide or list), and the user can receive information about the items with which the user had interacted during the online shopping session, through the mobile shopping application. In general, providing information for items in which the customer has expressed a previous online interest, when the user is in the vicinity of the item in the brick-and-mortar store, can save the customer time while potentially increasing revenue for the store. Further, by ranking such items according to a degree of online interest, and providing the information at opportune times according to the ranking (e.g., when the customer is in the vicinity of a highly ranked item and/or based on items that are already in the customer's shopping list), usefulness of the information to the customer can be ensured.

In some implementations, a method performed by data processing apparatuses includes receiving an indication of interest in an item being presented to a user by an online shopping interface, the indication of user interest in the item including a type of user interaction with the item through the online shopping interface; storing data that represents the indication of user interest in the item, with data that represents indications of user interest in other items; and in response to determining that the user is located within a physical store: (i) accessing the stored data that represents indications of user interest in the items, (ii) ranking the items that are available from the physical store, based at least in part on the type of user interaction, and (iii) providing one or more of the ranked items for presentation to the user, based at least in part on the ranking.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. Storing the data that represents the indication of user interest in the item can include storing, in a data structure, a user identifier of the user, an item identifier of the item, and the type of user interaction with the item through the online shopping interface. The type of user interaction with the item can include one or more of a browsing of the item through the online shopping interface, an adding of the item to a favorites list through the online shopping interface, an adding of the item to an online shopping cart through the online shopping interface, and an adding of the item to a saved for later list through the online shopping interface. Ranking the items can include assigning a given item a high ranking when the type of user interaction with the item includes the adding of the item to an online shopping cart or the adding of the item to a saved for later list through the online shopping interface. Ranking the items can include assigning a given item a high ranking when the item is subject to a promotional offer. Ranking the items can include assigning a given item a medium ranking when the type of user interaction with the item includes an adding of the item to a favorites list through the online shopping interface. Ranking the items can include assigning a given item a low ranking when the type of user interaction with the item includes a browsing of the item through the online shopping interface. Providing one or more of the ranked items for presentation to the user can be based at least in part on preference data received from the user. Determining that the user is located within the physical store can include receiving, from a mobile computing device being operated by the user, location information that indicates a location of the mobile computing device within the physical store. The mobile computing device can execute a mobile shopping application that is configured to present information associated with the provided ranked items. In response to determining that the user is within an area of the physical store that is associated with a given item in the provided ranked items, a notification can be provided through the mobile shopping application that the given item is available in the physical store. The mobile shopping application can be configured to present a shopping list. Providing the notification that a given item is available in the physical store can include prompting the user to add the given item to the shopping list. In response to determining that a given item is within a threshold distance of one or more items that are included on the shopping list, the user can be prompted to add the given item to the shopping list. The shopping list can be arranged according to an optimized path that includes a location of the mobile computing device and locations of items in the shopping list.

The systems, devices, program products, and processes described throughout this document can, in some instances, provide one or more of the following advantages. Item information can be provided to a mobile device for presentation to a user for appropriate items, at appropriate times, and/or when the user is in an appropriate location, such that application alerts may be provided at an appropriate frequency. Shopping list applications can be integrated with recommendation systems and location determination systems, such that digital shopping lists may be more easily generated and better organized. Online shopping and physical shopping applications can be coordinated and streamlined, such that data discrepancies may be prevented.

Other features, aspects and potential advantages will be apparent from the accompanying description and figures.

DESCRIPTION OF DRAWINGS

Like reference symbols in the various drawings indicate like elements

DETAILED DESCRIPTION

This document describes technology that can determine, provide, and present personalized recommendations for items located in a physical space based on various factors, such as prior online interactions with items, items having been added to digital shopping lists, historical online and/or in-store purchases, and/or cohort item interactions. For example, a user can interact with an item during an online shopping session at an online store (e.g., browse the item, add the item to a favorites list, add the item to an online shopping cart, add the item to a save for later list, etc.). As another example, based on historical shopping data, the user may be a regular purchaser of an item. As another example, other users having a similar shopping profile to the user may have expressed interest in an item (e.g., through online interactions and/or past purchases). While the user shops at a physical store, for example, the user can receive information for the item (e.g., a notification that the item is available in the physical store, a suggestion to add the item to the user's digital shopping list, etc.), through a mobile shopping application executed by a user device (e.g., the user's smartphone or another suitable device). Determining which items for which to provide information can include a ranking/scoring process that evaluates item interactions based on various factors, such as recency of interaction, type of interaction, and other suitable factors. Notifications including item information can be triggered based at least in part on a physical location of the user's device in the physical store, for example.

Figure 1A:
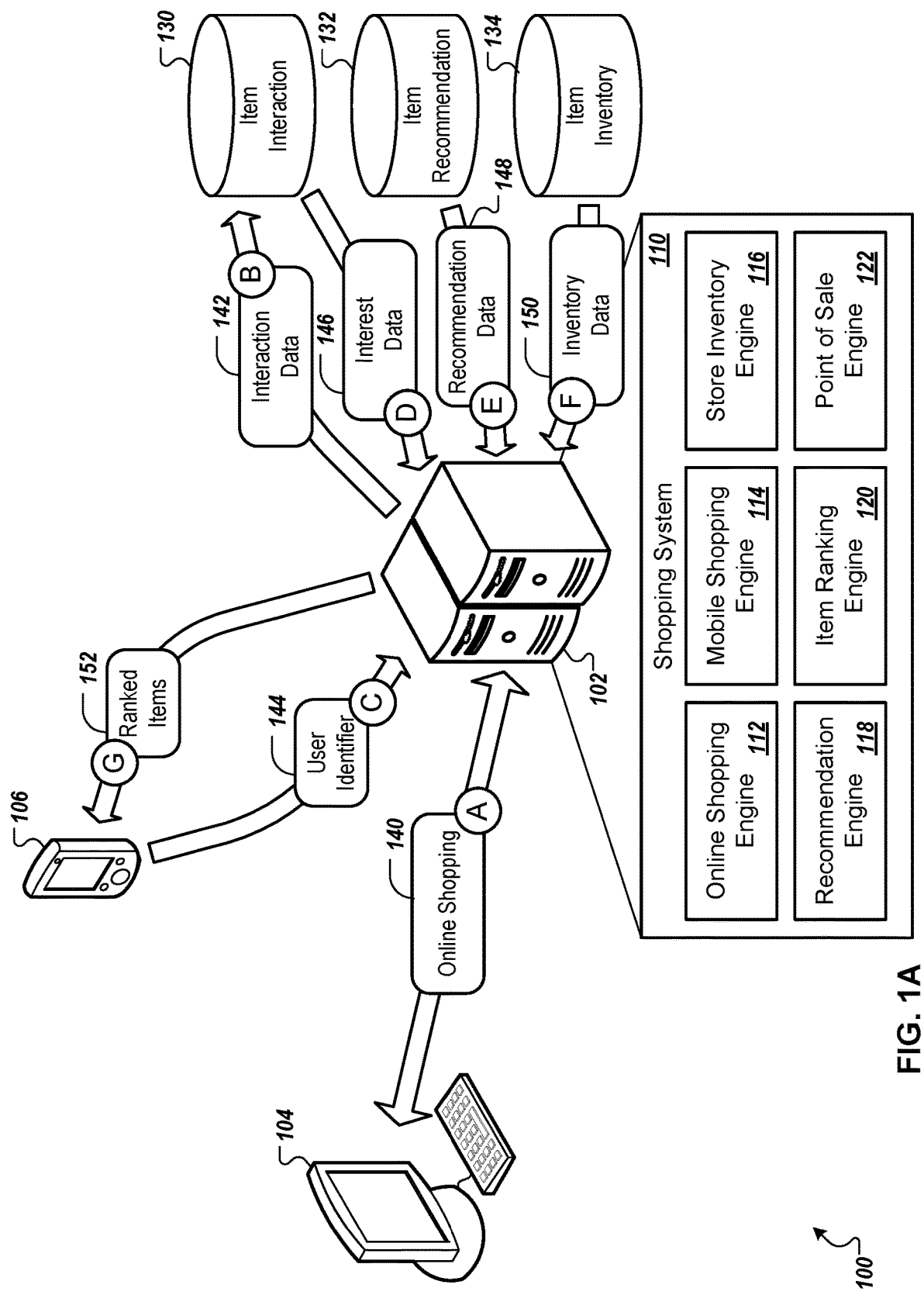
FIGS. 1A and 1B are conceptual drawings of an example system for determining, providing, and presenting personalized recommendations for items located in a physical space.
Figure 1B:
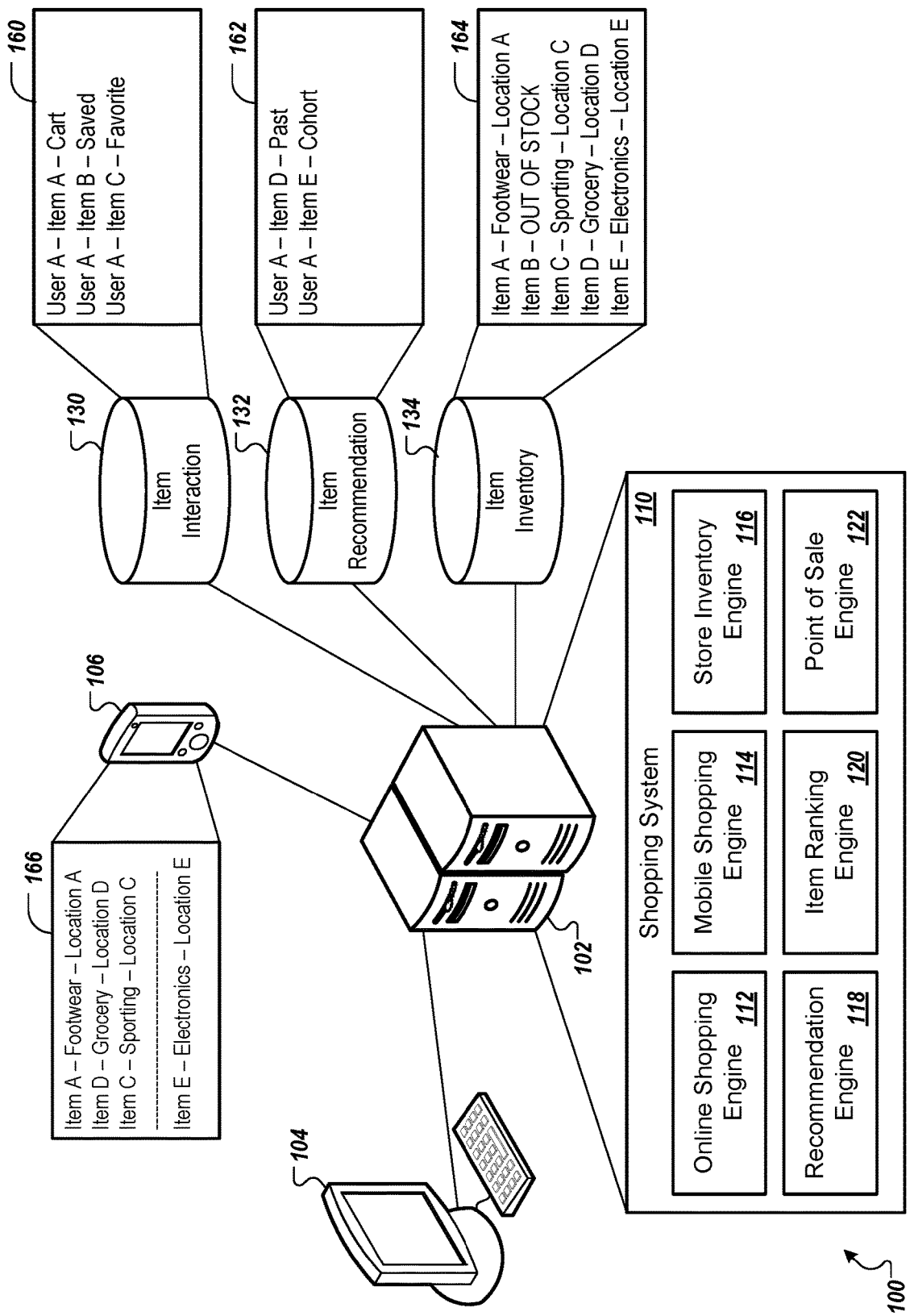

FIGS. 1A and 1B are conceptual diagrams of an example system 100 for determining, providing, and presenting personalized recommendations for items located in a physical space. In general, the system 100 includes systems for determining interior locations of mobile computing devices within the physical space (e.g., a store), systems for correlating items (e.g., products) with specific locations within the physical space, systems that can determine user (e.g., customer) interests based on user activity, and point of sale system integration such that offers can be made available to selective/qualifying users.

In the depicted example, the system 100 includes one or more computing servers 102 that communicate with one or more online computing devices 104 and one or more mobile computing devices 106. Communications between the computing servers 102, the online computing device(s), and the mobile computing device(s) 106, for example, can occur over one or more communication networks (not shown), including a LAN (local area network), a WAN (wide area network), and/or the Internet. In some examples, the computing servers 102 can represent various forms of servers, including but not limited to network servers, web servers, application servers, or other suitable computing servers. The computing servers 102, for example, can access data from various sources (e.g., databases, file systems, and/or cached data sources), can execute software that processes the accessed data, and can provide information based on the accessed data to the online computing device(s) 104 and/or the mobile computing device(s) 106. In the present example, the computing servers 102 can provide an integrated shopping system 110 that includes various software engines, which may be combined or separate, and may be co-located or distributed. For example, the shopping system 110 can include an online shopping engine 112, a mobile shopping engine 114, a store inventory engine 116, a recommendation engine 118, an item ranking engine 120, and a point of sale engine 122. The shopping system 110 provided by the computing servers 102 can maintain data in various data sources, for example, an item interaction data store 130, an item recommendation data store 132, and an item inventory data store 134. In some examples, the online computing device 104 can represent various forms of stationary or mobile processing devices including, but not limited to a desktop computer, a laptop computer, a tablet computer, a personal digital assistant (PDA), a smartphone, or other processing devices. In some examples, the mobile computing device 106 can represent various forms of mobile processing devices including, but not limited to a tablet computer, a personal digital assistant (PDA), a smartphone, or other processing devices. The online computing device 104 and the mobile computing device 106, for example, can be a same computing device or can be different computing devices.

FIG. 1A also illustrates an example process flow for providing and presenting information associated with an item in a physical space, shown in stages (A) to (G). Stages (A) to (G) may occur in the illustrated sequence, or they may occur in a sequence that is different than in the illustrated sequence, and/or two or more stages (A) to (G) may be concurrent.

Figure 2:
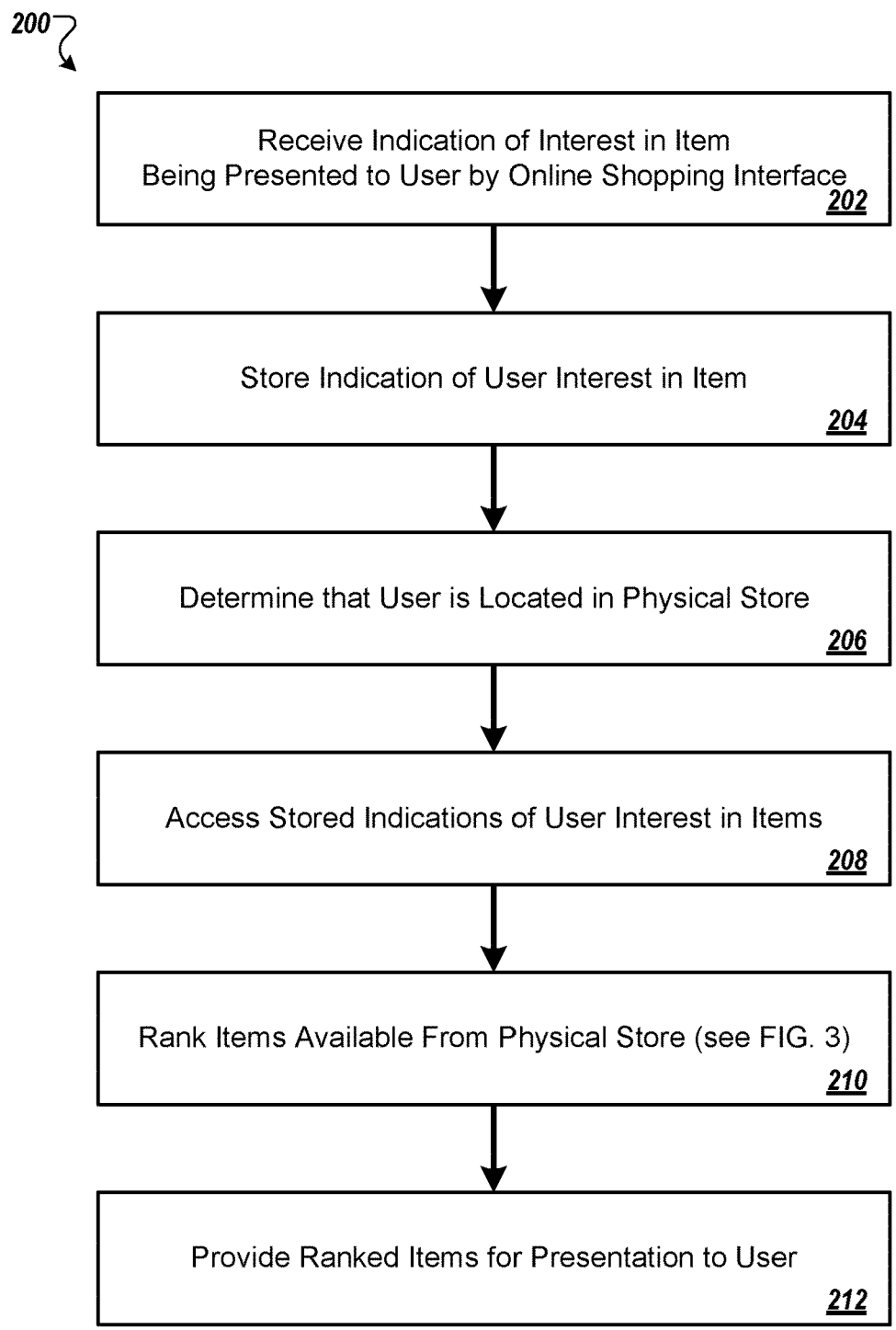
FIG. 2 shows an example process for providing information associated with an item.

Referring now to FIG. 2, an example process 200 is shown for providing information associated with an item. Providing such item information can be based on various factors, such as prior online interactions with items, items having been added to digital shopping lists, historical online and/or in-store purchases, and/or cohort interactions with items. The process 200 can be performed by components of the system 100, for example, and will be described with reference to FIGS. 1A and 1B. However, other systems may be used to perform the same or similar process.

An indication of interest can be received for an item being presented to a user by an online shopping interface (202). Referring again to FIG. 1A, during stage (A), the user can employ the online computing device 104 to conduct an online shopping session 140, including receive information associated with various items (e.g., products), and potentially interacting with (e.g., viewing, selecting, saving) such items. For example, the shopping system 110 can use the online shopping engine 112 (e.g., a backend system for hosting a virtual store, a shopping website and/or application, etc.) to provide data for rendering user interfaces to the computing device 104, and to receive data that corresponds to user interactions with the user interfaces.

In general, the indication of user interest in the item can include a type of user interaction with the item through the online shopping interface. Referring now to FIGS. 4A-D, example online interfaces are shown that can be rendered by the computing device 104 (shown in FIG. 1A), and through which users can interact with various items in various ways. After logging into a virtual store, shopping website and/or application, for example, a user can search an online catalog of items, and can perform various interactions with one or more of the items, each interaction indicating a possible type of interest that the user may have with respect to an item.

Figure 4A:
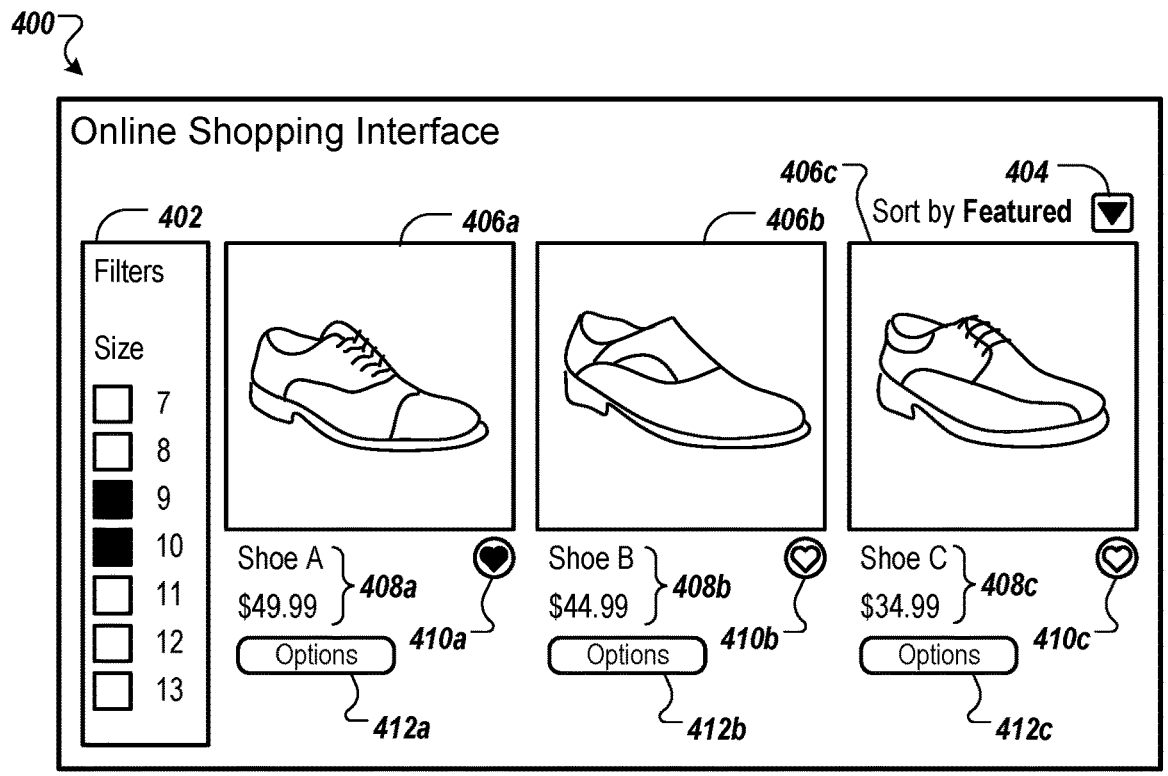
FIGS. 4A-D show example online interfaces through which a user can interact with an item.

FIG. 4A shows an example online shopping interface 400 through which a user can browse for and compare different items, and select one or more items for further consideration. For example, the online shopping engine 112 (shown in FIG. 1A) can provide data for rendering the interface 400 which presents different items (e.g., shoes) that are available from the virtual store, shopping website and/or application. In the present example, the interface 400 includes one or more filters 402 (e.g., item parameters, such as shoe sizes, colors, etc.) and sort options 404 (e.g., sorting by featured items, prices, review scores, popularity, or other sorting options) for facilitating review of the items by the user. For each item presented by the interface 400 according to the filters 402 and sort options 404, for example, the interface 400 includes a representative image (e.g., one of images 406a-c) and corresponding product information (e.g., corresponding information 408a-c, including a description, price, and/or other suitable information). Each of the items depicted in the present example (e.g., Shoe A, Shoe B, and Shoe C) can also be associated with a respective favorites selection control 410*a-c* (e.g., a graphical toggle control) and a respective browsing selection control 412*a-c* (e.g., a clickable button). In response to the user selecting or deselecting the favorites selection control 410*a*, for example, the online shopping engine 112 can add or remove the corresponding item (e.g., Shoe A) to a favorites list (e.g., an list to which the user has expressly added items for possible further consideration and future review). In response to the user interacting with (e.g., clicking) the browsing selection control 412*a*, for example, the online shopping engine 112 can add the corresponding item (e.g., Shoe A) to a browsed list (e.g., an aggregated list of items that the user has browsed through the online shopping interface 400), and can present additional information and/or options with respect to the item.

Figure 4B:
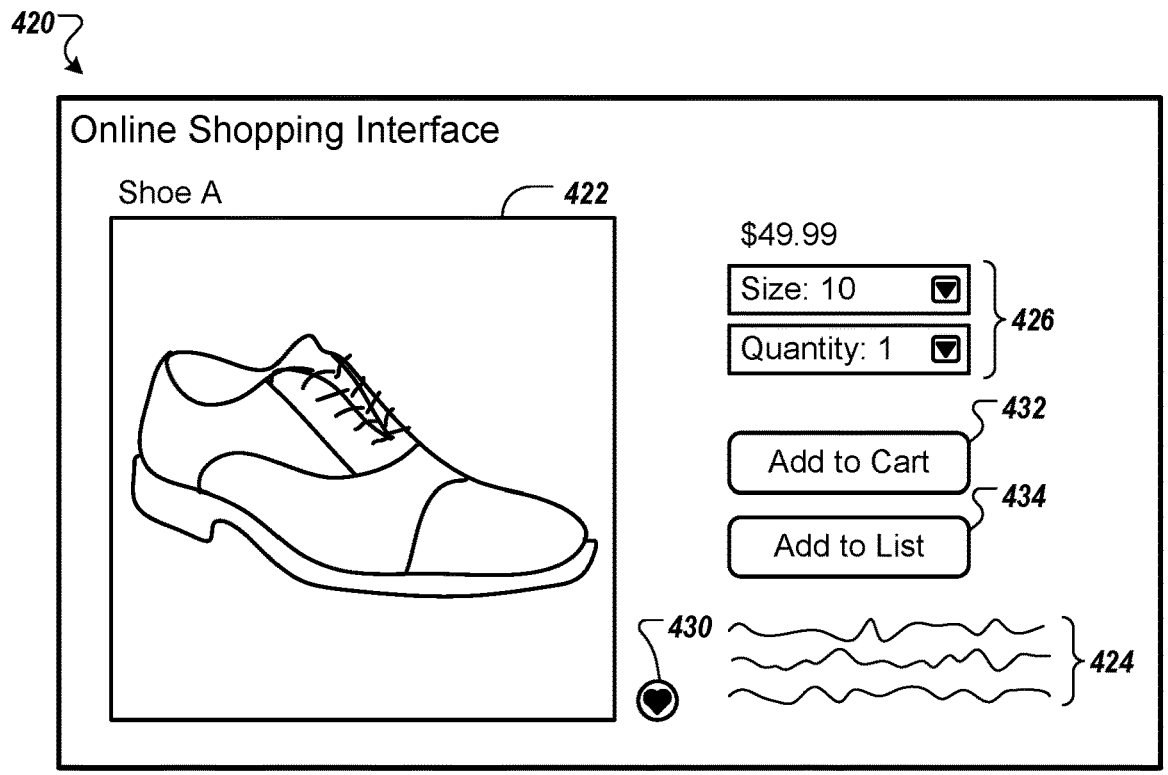

FIG. 4B shows an example online shopping interface 420 through which a user can review information associated with an item, add the item to an online shopping cart, and/or add the item to a shopping list. For example, after receiving a user selection of the browsing selection control 412*a* (shown in FIG. 4A), the online shopping engine 112 (shown in FIG. 1A) can provide data for rendering the interface 420 which presents additional information and options for the item (e.g., Shoe A) that corresponds to the selected control. In the present example, the interface 420 includes a representative image 422 of the item, item information 424 (e.g., product features, product specifications, product materials, product care instructions, manufacturer information, and other suitable information), and item customization selections 426 (e.g., size, quantity, color, and/or other suitable selections). The interface 420, for example, also includes a favorites selection control 430 (e.g., a graphical toggle control), an online shopping cart selection control 432 (e.g., a clickable button), and a shopping list selection control 434 (e.g., a clickable button). The user can interact with the favorites selection control 430, for example, to add the item to or remove the item from the user's favorites list. In response to the user interacting with (e.g., clicking) the online shopping cart selection control 432, for example, the online shopping engine 112 can add the item to an online shopping cart associated with the user. In response to the user interacting with (e.g., clicking) the shopping list selection control 434, for example, the online shopping engine 112 can add the item to a shopping list associated with the user.

Figure 4C:
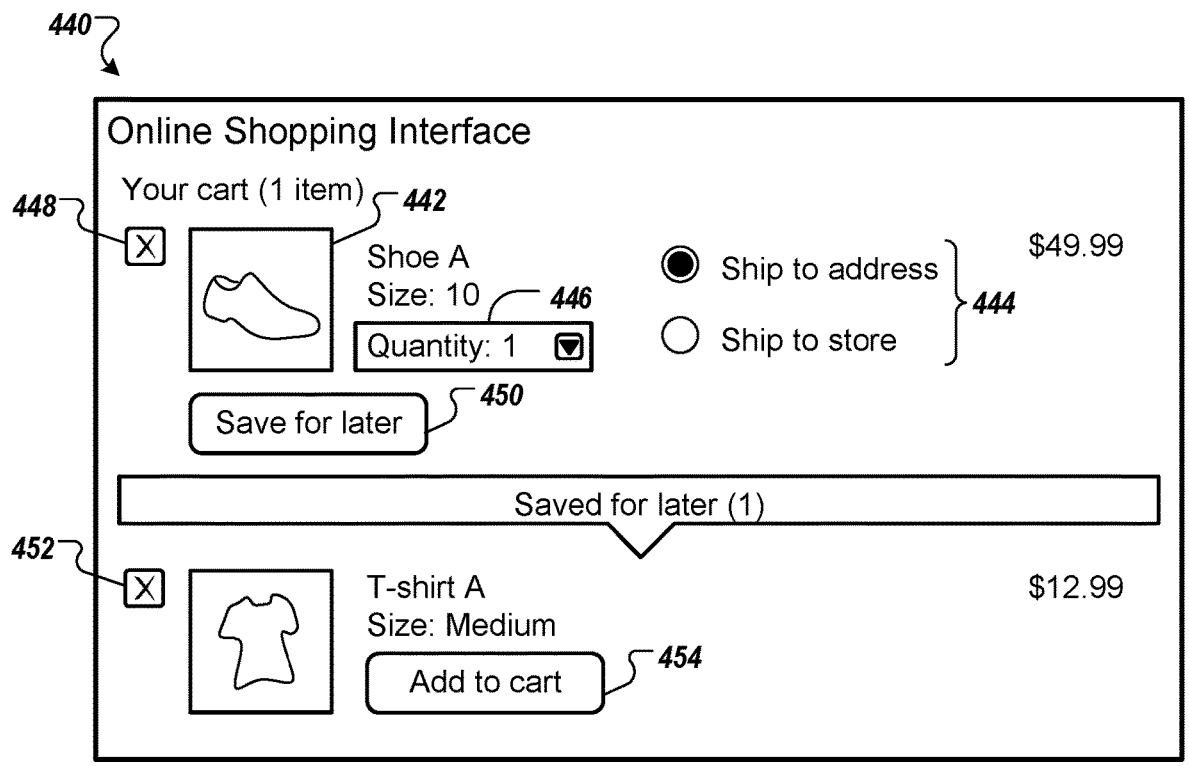

FIG. 4C shows an example online shopping interface 440 through which a user can manage an online shopping cart during an online shopping session. For example, in response to receiving a user selection of the online shopping cart selection control 432 (shown in FIG. 4B), the online shopping engine 112 (shown in FIG. 1A) can add the corresponding item to the user's online shopping cart. When the user navigates to the interface 440, for example, the online shopping engine 112 can provide data for rendering the interface 440 which presents the list of items which have been added to the user's online shopping cart. In the present example, the interface 440 includes a representative image 442 of the item (e.g., Shoe A), shipping options 444 (e.g., ship to address or ship to store), and item customization selections 446 (e.g., size, quantity, color, and/or other suitable selections). The items which have been added to the user's online shopping cart, for example, can remain in the online shopping cart until such time that the items are purchased through the virtual store, shopping website and/or application (e.g., a current online shopping session, or a later online shopping session). In the present example, the interface 440 includes a removal control 448 through which the user can explicitly remove the corresponding item (e.g., Shoe A) from the online shopping cart, and a save for later selection control 450. In response to the user interacting with (e.g., clicking) the save for later selection control 450, for example, the online shopping engine 112 can remove the item from the user's online shopping cart and add the item to a saved for later list associated with the user. The saved for later list, for example, can include one or more items that the user has removed from the online shopping cart, but may choose to re-add at a future time. In the present example, the interface 440 includes a removal control 452 through which the user can remove the corresponding item (e.g., T-shirt A) from the saved for later list, and an add to cart selection control 454. In response to the user interacting with (e.g., clicking) the add to cart selection control 454, for example, the online shopping engine 112 can remove the corresponding item (e.g., T-shirt A) from the saved for later list and re-add the item to the online shopping cart.

Figure 4D:
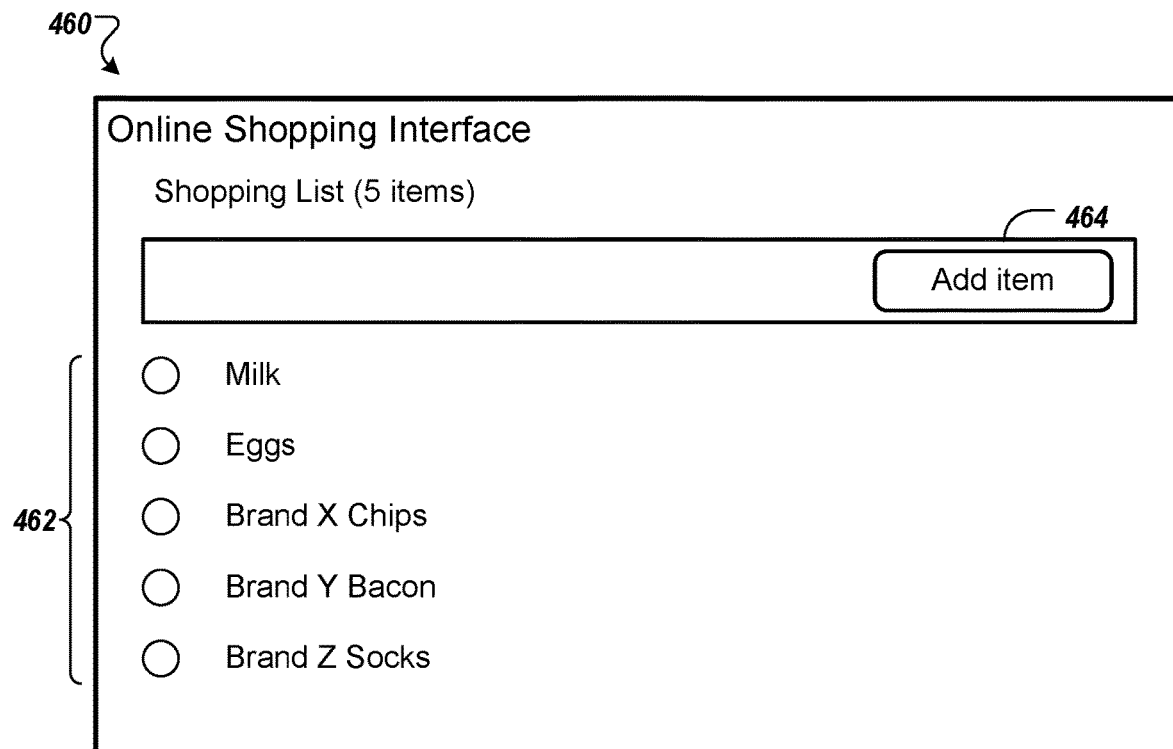

FIG. 4D shows an example online shopping interface 460 through which a user can manage a shopping list 462 during an online shopping session. For example, in response to receiving a user selection of the shopping list selection control 434 (shown in FIG. 4B), the online shopping engine 112 (shown in FIG. 1A) can add the corresponding item to the user's shopping list 462. When the user navigates to the interface 460, for example, the online shopping engine 112 can provide data for rendering the interface 460 which presents the items which have been added to the user's shopping list 462, and one or more controls for adding additional items. In the present example, the interface 460 includes an item entry control 464 through which the user can enter (e.g., select, provide typed and/or spoken input, etc.) information designating various branded and non-branded items to add to the shopping list 462 (e.g., milk, eggs, Brand X Chips, Brand Y Bacon, Brand Z Socks). Each item in the shopping list 462, for example, can be associated with a selection control that causes the corresponding item to be removed from the online shopping list. As described in examples below with respect to FIGS. 6A-C, information associated with the shopping list 462 can be provided to the mobile computing device 106 (e.g., the same device as the online computing device 104, or a different computing device) for rendering the shopping list in the context of a mobile shopping interface in a physical store.

Referring again to FIG. 2, the indication of interest in the item can be stored, with indications of user interest in other items (204). As shown in FIG. 1A, for example, during stage (B), the online shopping engine 112 can provide interaction data 142 associated with the online shopping session 140 for storage and maintenance by the item interaction data store 130. In some implementations, storing an indication of user interest in an item may include storing, in a data structure, a user identifier, an item identifier, and a type of interaction with the item through an online shopping interface. For example, if a user interacts with the favorites selection control 410*a* (shown in FIG. 4A) or favorites selection control 430 (shown in FIG. 4B), the item interaction data store 130 can associate the user (e.g., User A) with the item (e.g., Shoe A) and the type of interaction (e.g., added to favorites). As another example, if the user interacts with the browsing selection control 412*a* (shown in FIG. 4A), and/or navigates to the online shopping interface 420 (shown in FIG. 4B) which presents item-specific information and/or options, the item interaction data store 130 can associate the user (e.g., User A) with the item (e.g., Shoe A) and the type of interaction (e.g., browsed). As another example, if the user interacts with the online shopping cart selection control 432 (shown in FIG. 4B) or add to cart selection control 454 (shown in FIG. 4C), the item interaction data store 130 can associate the user (e.g., User A) with the item (e.g., Shoe A) and the type of interaction (e.g., added to online shopping cart). As another example, if the user interacts with the save for later selection control 450 (shown in FIG. 4C), the item interaction data store 130 can associate the user (e.g., User A) with the item (e.g., Shoe A) and the type of interaction (e.g., added to saved for later list). A user's item selections for the shopping list 462 (shown in FIG. 4D), for example, may be stored using the item interaction data store 130, or another data structure. In general, an item may be associated with multiple different interaction types for a user, may be associated with a single interaction type, or may not be associated with any interactions. For example, an item may have been browsed, favorited, and added to a user's online shopping cart for later purchase, whereas another item may have only been browsed, and another item may not have been interacted with at all.

In some implementations, storing an indication of user interest may include storing timestamp data in the data structure, along with the user identifier, item identifier, and type of interaction. For example, the item interaction data store 130 can associate a date and time at which an interaction occurred (e.g., browsing, adding to favorites, adding to an online shopping cart, adding to a saved for later list, etc.), along with the association data for the interaction. Storing the indication of user interest, for example, can include storing positive and negative interactions, such as when items are added and/or removed from various lists (e.g., favorites, online shopping cart, saved for later, and/or shopping list). A user's current interest in an item may be determined from processing data that represents the positive and negative interactions with the item, from the item interaction data store 130, for example.

Referring again to FIG. 2, a determination can be made that the user is located within a physical store (206). As shown in FIG. 1A, for example, during stage (C), the user can employ mobile computing device 106 (e.g., the same device as the online computing device 104, or a different computing device) while in or near the physical store (e.g., a brick-and-mortar counterpart to the virtual store, shopping website and/or application through which prior item interactions occurred), and the shopping system 110 can receive a user identifier 144 associated with the device user. The user identifier 144, for example, can be provided by the mobile computing device 106, a communications carrier associated with the device 106, and/or through an application being executed by the device 106. For example, the communication carrier of the mobile computing device 106 can configure a geo-fenced area around the physical store, and with the user's permission, the communication carrier can provide the user identifier 144 to the shopping system 110 along with a notification that the user has entered the geo-fenced area. As another example, the device user can employ a mobile shopping application being executed by the mobile computing device 106 (e.g., the user's personal device, or a device provided by the physical store, such as a handheld device or a device affixed to a shopping cart or basket), and with the user's permission, the mobile shopping application can provide the user identifier 144, and location data that indicates a current location of the device 106 within the physical store. The mobile shopping application can communicate with the shopping system 110 using the mobile shopping engine 114, for example. Device location data, for example, can be based on Global Positioning System (GPS) data, Wi-Fi triangulation data, Bluetooth Mesh data, user-entered data, or other suitable location data.

The stored indications of user interest in the items can be accessed (208). As shown in FIG. 1A, for example, during stage (D), the shopping system 110 can receive interest data 146 from the item interaction data store 130. Referring to FIG. 1B, for example, item interaction data 160 is shown that associates user identifiers, item identifiers, and interaction types that indicate possible interest that the user may have in various items. In the present example, the item interaction data 160 indicates that User A has added Item A to an online shopping cart, has added Item B to a saved for later list, and has added Item C to a list of favorite items.

In some implementations, item recommendation data may be accessed and evaluated when determining a list of items for which item information is to be provided. As shown in FIG. 1A, for example, during stage (E), the shopping system 110 can use the recommendation engine 118 to receive recommendation data 148 from the item recommendation data store 132, and to generate one or more item recommendations for the user. Referring to FIG. 1B, for example, item recommendation data 162 is shown that associates user identifiers, item identifiers, and recommendation types that indicate items to potentially recommend to users. In the present example, the item recommendation data 162 determined by the recommendation engine 118 indicates that for User A, Item D is a past purchase item (e.g., the item has been previously purchased by the user at or above a threshold frequency), and Item E is a cohort recommendation item (e.g., the item has been previously purchased by other users having a similar profile as User A, and/or other users having a similar profile as User A have indicated interest in the item).

In some implementations, items that are subject to promotional offers (e.g., items that are on sale, items that are associated with a physical or digital coupon, items that are associated with a promotional code, etc.) can be recommended to users. For example, general items, past purchase items, and/or cohort recommendation items can be recommended to users when the items are subject to promotion offers. As another example, an item that is subject to a promotional offer and is of a product type that is similar to a past purchase item of a user can be recommended to the user (e.g., Brand A toothpaste can be recommended to a past purchaser of Brand B toothpaste when Brand A is on sale).

In some implementations, item inventory data may be accessed and evaluated when determining a list of items for which item information is to be provided. As shown in FIG. 1A, for example, during stage (F), the shopping system 110 can use the store inventory engine 116 to receive inventory data 150 from the item inventory data store 134, to determine whether items that may be of interest to the user and/or items that may be recommended to the user are currently available at the physical store where the user is located, and to determine the locations of the items within the physical store. Referring to FIG. 1B, for example, item inventory data 164 is shown that associates item identifiers, section identifiers (e.g., department, aisle, etc.), and/or location identifiers (e.g. indicating a location of an item within a physical store according to an XY coordinate system) for various items. In the present example, the item inventory data 164 determined by the store inventory engine 116 indicates that Item A is available in the Footwear department at Location A, Item B is out of stock, Item C is available in the Sporting department at Location C, Item D is available in the Grocery department at Location D, and Item E is available in the Electronics department at Location E.

Referring again to FIG. 2, the items that are available from the physical store can be ranked, based at least in part on the type of user interaction (210). As shown in FIG. 1A, for example, the shopping system 110 can use the item ranking engine 120 and the interest data 146, recommendation data 148, and inventory data 150 to rank various items for possible presentation to the user of the mobile computing device 106.

Figure 3:
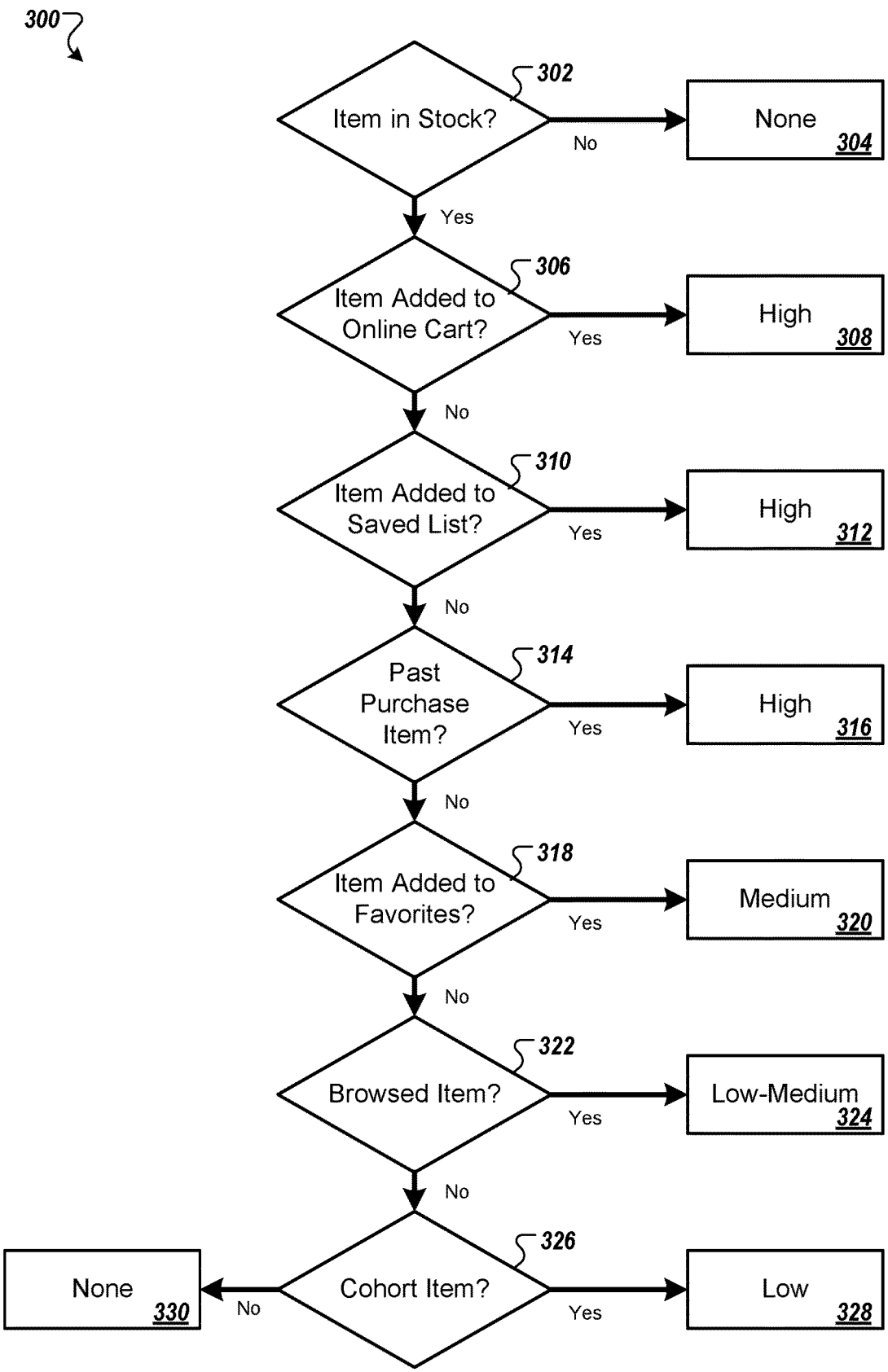
FIG. 3 shows an example process for ranking items.

Referring now to FIG. 3, an example process 300 for ranking items is shown. The process 300 can be performed by components of the system 100, for example, and will be described with reference to FIGS. 1A and 1B. However, other systems may be used to perform the same or similar process. In the present example, items in which the user has indicated a possible interest (e.g., items described in the item interaction data 160, shown in FIG. 1B) and items that may be potentially recommended to the user (e.g., items described in the item recommendation data 162, also shown in FIG. 1B) can be evaluated and ranked by the process 300. Alternately, only items in which the user has indicated a possible interest, or only items that may be potentially recommended to the user may be evaluated and ranked.

A determination can be performed of whether an item is in stock in the physical store (302). For example, the item ranking engine 120 can evaluate each of the items described in the item interaction data 160 and the item recommendation data 162, and determine whether the item is in stock, according to the item inventory data 164 (shown in FIG. 1B). In the present example, Item B is out of stock, and is thus assigned no ranking score (304). Out of stock items, for example, can be removed from further consideration for possible presentation to the users.

A determination can be performed of whether an item has been added to the user's online shopping cart (306). For example, the item ranking engine 120 can identify one or more items described in the item interaction data 160 that are associated with an online shopping cart interaction type. In the present example, Item A has been added to the user's online shopping cart, and is thus assigned a relatively high ranking score (308). In some implementations, an amount of time that has passed since the item had been added to the user's online shopping cart may be considered as a factor in adjusting the ranking score for the item. For example, the ranking scores of items that have recently been added to the user's online shopping cart (e.g., within the past hour, day, week, or other suitable time period) may be increased, whereas the ranking scores of items that have not recently been added to the user's online shopping cart may not be adjusted or may be decreased. In some implementations, additional user interactions with the item may considered as a factor in adjusting the ranking score for the item. For example, the ranking scores of items in the user's online shopping cart that the user has also added to a list of favorites may be increased, whereas the ranking scores of items that the user has removed from the list of favorites may be decreased. In some implementations, item recommendations may be considered as a factor in adjusting the ranking score for the item. For example, the ranking scores of items that are also described in the item recommendation data 162 may be increased.

A determination can be performed of whether an item has been added to a saved for later list (310). For example, the item ranking engine 120 can identify one or more items described in the item interaction data 160 that are associated with a saved for later interaction type. In the present example, Item B has been added to the user's saved for later list, however the item is not presently in stock and thus has already been assigned no ranking score and has been removed for further consideration. If the item were to be in stock, the item may be assigned a relatively high ranking score (312). As with items that are associated with an online shopping cart interaction type, for example, ranking scores of items that are associated with a saved for later interaction type may be adjusted based on an amount of time that has elapsed since the interaction occurred, additional user interactions with the items, item recommendations, or other suitable factors.

A determination can be performed of whether an item is a past purchase item (314). For example, the item ranking engine 120 can identify one or more items described in the item recommendation data 162 that are associated with a past purchase recommendation type (e.g., items that the user has previously purchased, according to transaction history data determined by the point of sale engine 122). In the present example, Item D has been previously purchased by the user at or above a threshold frequency (e.g., once per week, once per month, or another suitable frequency), and is thus assigned a relatively high ranking score (316).

A determination can be performed of whether an item has been added to a list of favorite items (318). For example, the item ranking engine 120 can identify one or more items described in the item interaction data 160 that are associated with a favorited interaction type. In the present example, Item C has been added to the user's list of favorite items, and is thus assigned a medium ranking score (320). As with items that are associated with an online shopping cart interaction type or a saved for later interaction type, for example, ranking scores of items that are associated with a favorited interaction type may be adjusted based on an amount of time that has elapsed since the interaction occurred, additional user interactions with the items, item recommendations, or other suitable factors.

A determination can be performed of whether an item has been browsed (322). For example, the item ranking engine 120 can identify one or more items described in the item interaction data 160 that are associated with a browsed interaction type. In the present example, no items are solely associated with the browsed interaction type, but if such items were to exist, the items would be assigned a low-medium ranking score (324). As with items that are associated with other interaction types, for example, ranking scores of items that are associated with a browsed interaction type may be adjusted based on an amount of time that has elapsed since the interaction occurred, additional user interactions with the items, item recommendations, or other suitable factors.

A determination can be performed of whether an item is a cohort item (326). For example, the item ranking engine 120 can identify one or more items described in the item recommendation data 162 that are associated with a cohort recommendation type (e.g., items that have been previously purchased by similar users, and/or in which similar users have expressed interest, according to transaction history data and/or interaction data). In the present example, Item E is a cohort recommendation item, and is thus assigned a relatively low ranking score (328). Other items (e.g., items that are not described in the item interaction data 160 or the item recommendation data 162), for example, may be assigned no ranking score (330).

In some implementations, ranking items may include increasing the ranking of items that may be subject to a promotional offer. For example, the item ranking engine 120 can identify one or more items described in the item interaction data 160 and/or the item recommendation data 162 that are on sale, are associated with a physical or digital coupon, are associated with a promotional code, or are subject to another sort of promotional offer. In the present example, a ranking of Item A (e.g., an item that has been added to the user's online shopping cart) and Item D (e.g., an item that has previously been purchased by the user) can each be increased, due to the items being subject to promotion offers. In some examples, a remaining duration of a promotional offer can be a factor that is used in increasing item rankings. For example, if a promotional offer associated with an item were to expire within a threshold amount of time (e.g., a day, two days, a week, or another appropriate amount of time), the ranking of the item may be increased by an amount that is greater than that of items having promotional offers that will not expire within the threshold amount of time.

Referring again to FIG. 2, at least some of the ranked items can be provided for possible presentation to the user, based at least in part on the ranking (212). As shown in FIG. 1A, for example, during stage (G), the shopping system 110 can provide ranked items 152 to the mobile computing device 106. Referring to FIG. 1B, in the present example, the ranked items 166 can include Item A (e.g., available in the Footwear department at Location A), Item D (e.g., available in the Grocery department at Location D), Item C (e.g., available in the Sporting department at Location C), and Item E (e.g., available in the Electronics department at Location E).

In some implementations, providing the ranked items for presentation to the user may be based at least in part on preference data received from the user. For example, an online shopping interface presented by the online computing device 104 and/or an mobile shopping application executed by the mobile computing device 106 can include a user preference selection interface (not shown) through which the user can specify that items associated with particular interaction types and/or recommendation types are to be included or excluded. If the user were to specify that cohort recommendation items are to be excluded, for example, Item E can be excluded from the ranked items 166. As another example, the user preference selection interface (not shown) can include an item ranking threshold control, and only items having a ranking score that meets a threshold specified by the user (e.g., a high threshold, a medium threshold, a low threshold, or no threshold) can be included in the ranked items 166.

In general, item information can be provided to a mobile device for presentation to a user through a mobile shopping application at suitable times and/or in suitable locations. In some implementations, item information for multiple different items can be provided to a mobile device at the same time. Referring to FIG. 1A, for example, when the shopping system 110 determines that the user is approaching or has entered a physical store, the shopping system 110 can provide all of the ranked items 152 to the mobile computing device 106. After the device 106 receives the ranked items, for example, the device can present information associated with the items at the same time (e.g., in a list interface), at different times (e.g., in response to changes in the device's location), and/or in response to a user request for such items. In some implementations, item information can be provided to a mobile computing device for multiple, different items at multiple, different times. For example, as the mobile computing device 106 moves through the physical store, the shopping system 110 can receive updated location data for the mobile computing device 106, and in response can provide one or more ranked items 152 that are appropriate based on the user's location (e.g., items that are within a threshold distance to the user, items that are in a same department as the user, or another location-based determination).

Figure 5:
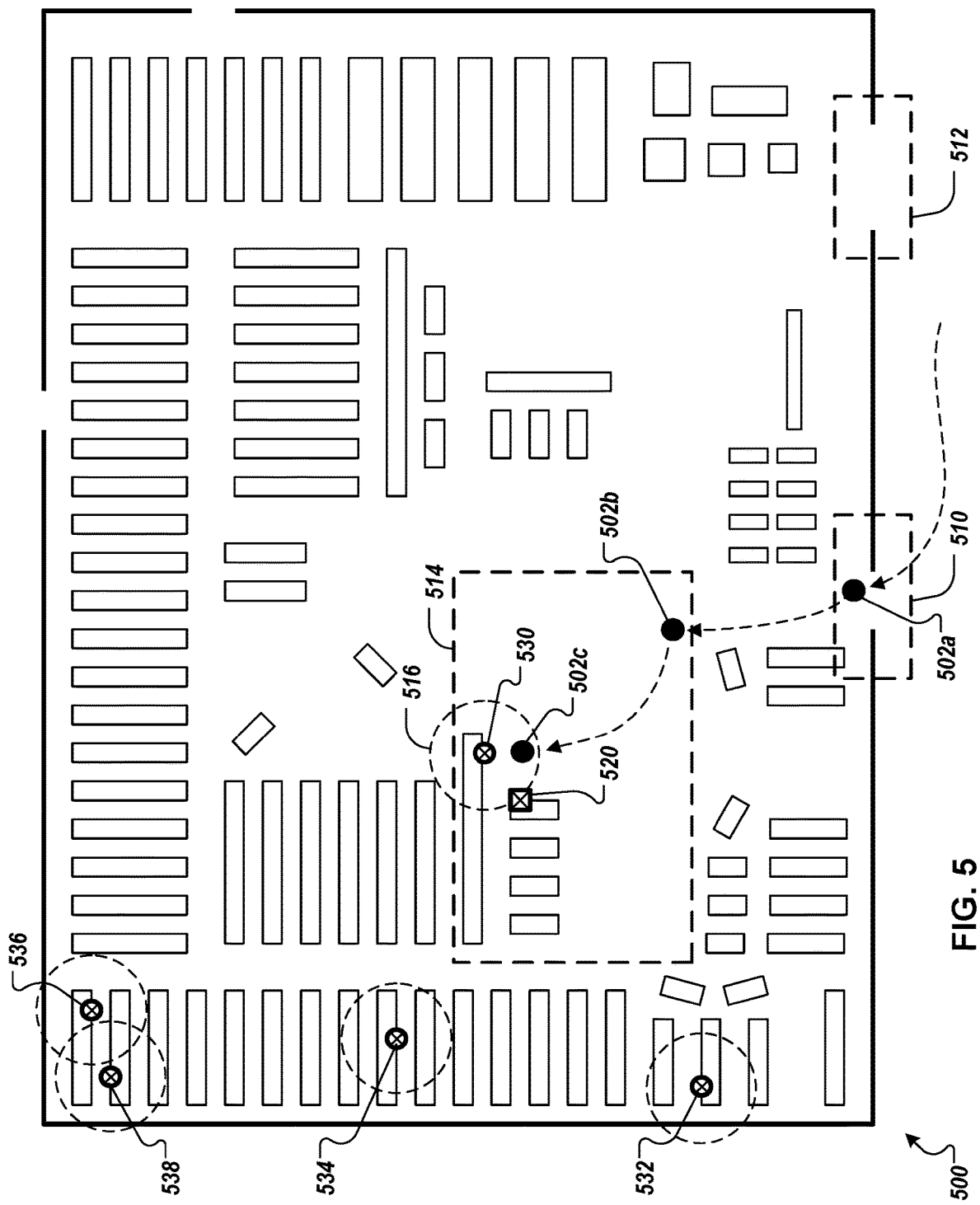
FIG. 5 shows an example physical space in which a user can be provided with item information.

Referring now to FIG. 5, an example physical space 500 is shown in which a user can be provided with item information. For example, the physical space 500 can be a physical store that is a counterpart to the virtual store, shopping website and/or application through which prior item interactions occurred. The physical store and the virtual store, for example, may be operated by a common organization. As another example, the physical store and the virtual store may be operated by different organizations, but may offer at least some of the same items, and may share data and/or computing resources. A mobile shopping application can be provided for execution by mobile computing devices (e.g., mobile computing device 106, shown in FIG. 1A) being operated by users as they move throughout the physical store, for example. The mobile shopping application, for example, can include various features to enhance the user's shopping experience, such as one or more maps to facilitate navigation through the store, search capabilities to help users locate items in the store, notifications of special offers on items (e.g., electronic coupons), reminders to pick up special orders and prescriptions, and other suitable features. In some implementations, the mobile shopping application may present a shopping list that has been specified by the user. For example, the shopping list may have been specified by the user through the online shopping interface 460 (shown in FIG. 4D), through the mobile shopping application itself, or through another interface. The user can use the mobile shopping application to add items to or remove items from the shopping list while in the physical store, for example.

In some implementations, the mobile shopping application may use device location data (e.g., based on Global Positioning System (GPS) data, Indoor Positioning System (IPS) data, Visual Light Communication (VLC) data, Wi-Fi triangulation data, Bluetooth Mesh data, user-entered data, or other suitable location data) to provide location-specific features to the user. For example, a device's current location can be used to place an icon that represents the device on a store map, to provide location-specific notifications (e.g., special offers on nearby items), and/or to provide location-specific suggestions for items to add to the user's shopping list. Techniques for determining device locations and/or product locations is disclosed, for example, in U.S. patent application Ser. No. 16/582,580 to Black et al, herein incorporated by reference in its entirety.

An example of providing location-specific features to a user through a mobile shopping application will now be described with respect to FIG. 5 and FIGS. 6A-C. As shown in FIG. 5, for example, the user can enter the store, and can move to location 502a, which is in zone 510. The shopping system 110 (shown in FIG. 1A), for example, can maintain associations between various store areas and various trigger events for mobile computing devices operating in the physical space 500. When a particular device (e.g., mobile computing device 106, shown in FIG. 1A) enters an area associated with a trigger event (e.g., as determined using location data associated with the device 106), for example, the mobile shopping engine 114 can provide information associated with the trigger event to the mobile shopping application being executed by the device. As another example, location information and instructions for handling trigger events can be provided to the mobile computing devices for execution. In the present example, the mobile computing device 106 can be triggered to present an application alert to the device user when the device 106 is within the zone 510 and the user is interacting with the mobile shopping application (e.g., viewing an application screen). When the mobile shopping application and/or the device 106 is not being used, for example, no alert may be presented to the device user. As another example, an alert may be triggered when the mobile shopping application and/or the device 106 is not being used (e.g., through an audio and/or vibration signal). A decision of whether or not to trigger an application alert when the mobile shopping application and/or the device 106 is or is not being used, for example, can be based at least in part on associated item rankings and user preference data, such that mobile application alerts may be provided at an appropriate frequency for the user.

Figures 6A, 6B, 6C:
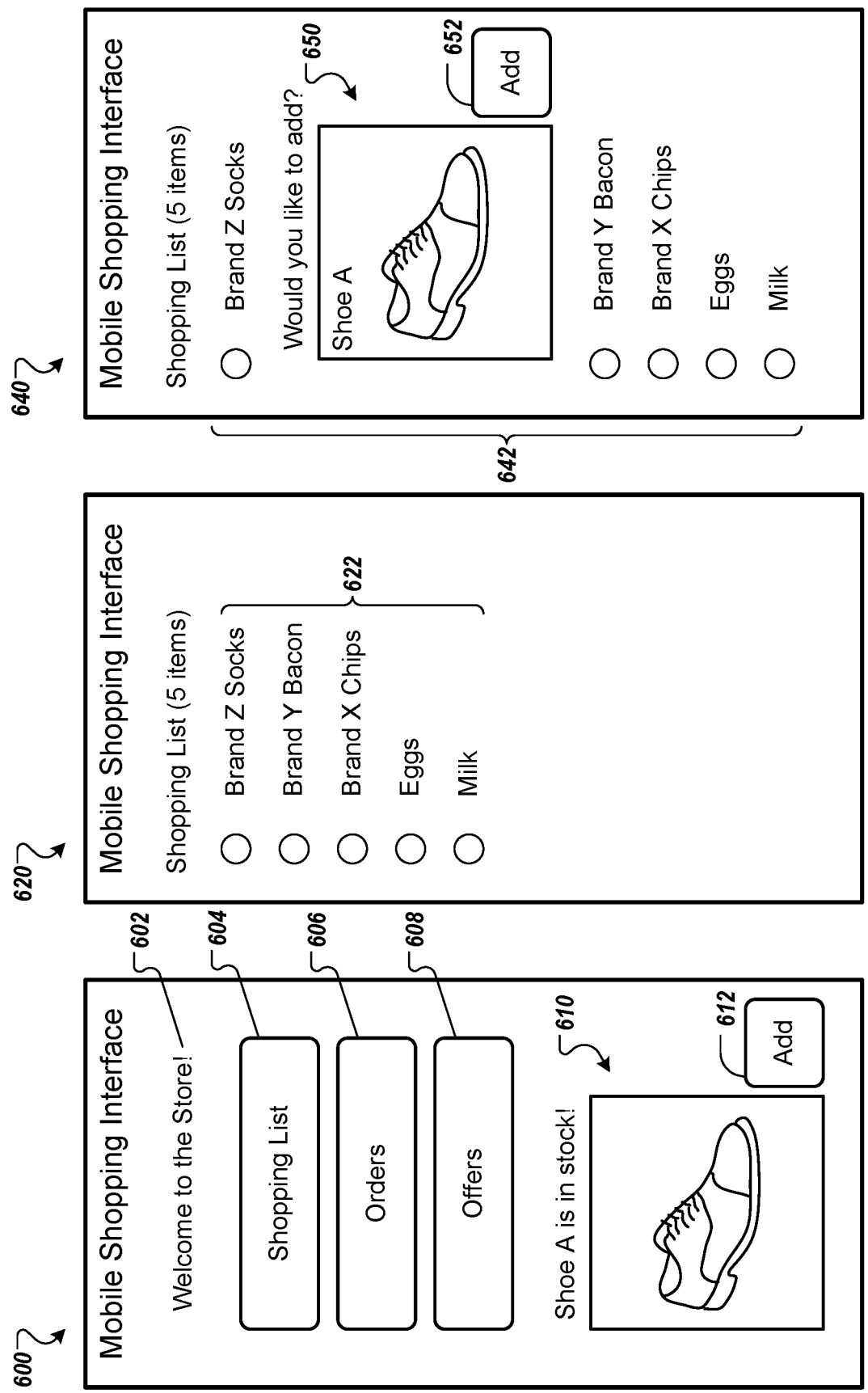
FIGS. 6A-C show example mobile device interfaces which can present item information to a user.

Referring now to FIG. 6A, an example mobile device interface 600 is shown for a mobile shopping application. For example, the mobile computing device 106 (shown in FIG. 1A) can present the interface 600 to the device user when the user enters the physical store. In the present example, the interface 600 includes a welcome message 602, a shopping list selection control 604, an orders selection control 606, and an offers selection control 608. Each of the selection controls 604, 606, 608, for example, may be interacted with (e.g., clicked) by the user, and in response to such interaction, the mobile shopping application can present information requested by the user. In response to user interaction with the shopping list selection control 604, for example, the mobile shopping application can present the user's shopping list. In response to user interaction with the orders selection control 606, for example, the mobile shopping application can present the user's orders (e.g., a special order or prescription available for pick-up). In response to user interaction with the offers selection control 608, for example, the mobile shopping application can present offers (e.g., electronic coupons, sales, etc.) available to the user.

In some implementations, in response to determining that the user is within a defined area of a physical store that is associated with an item in which the user has previously expressed an online interest through the online shopping interface and/or a recommended item (e.g., an item subject to a promotional offer), the mobile shopping application may provide a notification that the item is available in the physical store. For example, the zones 510, 512 (e.g., store entrances, shown in FIG. 5) can be defined by the shopping system 110 as areas that are to trigger presentation of information related to one or more items in which the user may be interested (e.g., highly ranked items from the list of ranked items 152, shown in FIG. 1A), when the mobile computing device 106 is within one of the areas. In the present example, the user has previously expressed interest in an item (e.g., Shoe A) through interaction with one or more of the online shopping interfaces depicted in FIGS. 4A-C, and thus the interface 600 can present a notification message 610 informing the user that the item is available in the physical store (e.g., "Shoe A is in stock!"). In some examples, the notification message 610 may include additional information for assisting the user with locating the item, such as an image of the item, a map location of the item, directions to the item, or other suitable information. In some examples, the notification message 610 may include information associated with a promotional offer for the item. For example, if the item were to be on sale and/or if a physical or digital coupon were to be applicable to the item, the notification message 610 may appropriately inform the user.

In some implementations, other zones may be defined as areas that are to trigger presentation of information associated with an item, in addition to or instead of store entrance areas. Referring again to FIG. 5, for example, an item in which the user has previously expressed an online interest (e.g., Shoe A) can be located in the physical store at location 520. The notification that the item is available in the physical store (e.g., notification message 610, shown in FIG. 6A) can be presented when the user is located in a same section of the store as the item (e.g., when the user moves to location 502b within zone 514, the Footwear department), for example. As another example, the notification that the item is available in the physical store can be presented when the user is located within a threshold distance of the item (e.g., when the user moves to location 502c, which is within five feet, ten feet, twenty feet, or another appropriate distance to the item).

In some implementations, providing a notification that an item is available in the store may include providing the notification in the context of a user's shopping list, and/or may include prompting a user to add the item to the user's shopping list. Referring again to FIG. 6A, for example, the interface 600 includes an add to shopping list control 612 through which the user can add the item described in the notification message 610. In response to the user interacting with (e.g., clicking) the control 612, for example, the mobile shopping application can add the item to the user's shopping list.

Referring now to FIG. 6B, for example, an example mobile device interface 620 is shown for presenting a shopping list 622 within a mobile shopping application. The shopping list 622, for example, can be based on the shopping list 462 generated by the user through the online shopping interface 460 (shown in FIG. 4D), can be generated through the interface 620, and/or can be generated through another sort of interface.

In some implementations, a shopping list may be arranged according to a device user's location in a physical store. Referring again to FIG. 5, for example, the user can enter the store and requests presentation of the user's shopping list while at location 502a. In the present example, Brand Z socks may be at location 530, and thus may currently be the closest item in the device user's shopping list. Thus, in the present example, the mobile shopping application can present Brand Z socks at the top of the shopping list 622. Brand Y bacon may be at location 532, Brand X chips may be at location 534, eggs may be at location 536, and milk may be at location 538, for example, and each of these items may be placed in the shopping list 622 according to the item's distance to the device user's current location. As the user moves through the physical store, for example, the items in the shopping list 622 may be rearranged according to current distance to the device user.

In some implementations, a shopping list may be arranged according to an optimized path based on product locations in a physical store, a layout of the physical store, and a device user's location in the physical store. Referring again to FIG. 5, for example, while at location 502a, the user can request presentation of the user's shopping list, and in response, the mobile shopping application can arrange the device user's shopping list according to the optimized path for retrieving the items on the list. The optimized path, for example, can be a minimum distance path that includes the product locations of all of the items on the list and a point of sale device (e.g., a checkout register). In the present example, the mobile shopping application can present in order, Brand Y bacon (location 532), Brand X chips (location 534), milk (location 538), eggs (location 536), and Brand Z socks (location 530), thus forming a continuous path through the physical store that leads from the user's current location 502*a* and terminates at the point of sale device. In some examples, product perishability can be a factor that is used to arrange the shopping list according to the optimized path. For example, the optimized path can be generated such that perishable products (e.g., temperature-sensitive products such as frozen foods, dairy, meat, etc.) are placed toward the bottom of the shopping list, and non-perishable products are placed toward the top of the shopping list. In the present example, the shopping list can be arranged with non-perishable products (e.g., Brand Z socks (location 530) and Brand X chips (location 534)) being at the top of the shopping list, and with perishable products (e.g., eggs (location 536), milk (location 538), and Brand Y bacon (location 532)) being at the bottom of the shopping list, with each of the non-perishable and perishable sections of the list being arranged according to a minimum distance path through the physical store. In some examples, travel time through areas of the physical store can be a factor that is used to arrange the shopping list according to the optimized path. For example, congested store areas (e.g., areas in which other shoppers and/or workers are located, based on device data, camera data, etc.) can take more time to navigate through, and thus can be considered along with distance when arranging the shopping list.

In some implementations, a shopping list may be arranged according to a device user's preference. For example, the item order in the shopping list 622 can initially be the same as the item order in the shopping list 462. In the present example, the device user can interact with the shopping list 622 in various ways, such as selecting list items to receive item information, selecting list items to receive item location information, adding items to the list, removing items from the list, and/or manually rearranging items in the list.

In some implementations, in response to determining that an item is within a threshold distance of one or more items that are included in a shopping list, a user may be prompted to add the item to the shopping list. Referring now to FIG. 6C, for example, an example mobile device interface 640 is shown for adding items to a shopping list 642, based on item locations within a store. Referring again to FIG. 5, for example, the mobile shopping application can determine that an item in which the user has expressed a previous online interest and/or a recommended item (e.g., Shoe A, located at 520) is in a same section of the physical store as an item in the device user's shopping list 642 (e.g., Brand Z socks, located at 530). As another example, the mobile shopping application can determine that an item in which the user has previously expressed an online interest through the online shopping interface and/or a recommended item (e.g., Shoe A, located at 520) is within a threshold distance in the physical store of an item in the device user's shopping list 642 (e.g., Brand Z socks, located at 530), such as within five feet, ten feet, twenty feet, or another suitable distance. Referring again to FIG. 6C, for example, the interface 640 can present a prompt 650 to the device user to possibly add the item to the user's shopping list (e.g., "Would you like to add Shoe A?"). In response to the user interacting with (e.g., clicking) an add to shopping list control 652 that is associated with the item described in the prompt 650, for example, the mobile shopping application can add the item to the user's shopping list. In some implementations, an item added to a user's shopping list may be placed in the shopping list near (e.g., immediately above, below, alongside, etc.) an item that is proximate to the added item in a physical store. For example, when adding the item described in the prompt 650 (e.g., Shoe A), the mobile shopping application can place the item immediately above, below, or alongside a shopping list item which the added item is closest to in the physical store (e.g., Brand Z socks), to facilitate organized use of the shopping list. Location-based prompts to possibly add items to shopping lists while in a physical store may be provided at a beginning of a shopping trip (e.g., when a user enters the physical store), may be provided when a user enters a section of the physical store (e.g., the user can be prompted to add Shoe A when the user is in the Footwear section), and/or may be provided when the user is within a threshold distance of the item (e.g., the user can be prompted to add Shoe A when the user is shopping for Brand Z socks and happens to be close to Shoe A).

After receiving item information for an item with which the user has previously interacted during an online shopping session (and/or a recommended item), the user may choose to purchase the item. In some implementations, in response to an item purchase in a physical store, item interaction data with respect to a virtual store may be updated. If a user purchases an item which has been added to the user's online shopping cart or the user's saved for later list, for example, the point of sale engine 122 (shown in FIG. 1A) can provide information related to the purchase to the shopping system 110 (also shown in FIG. 1A), which can in turn update the item interaction data 130 (also shown in FIG. 1A) to remove the item from the user's online shopping cart or saved for later list, thus coordinating and streamlining online shopping and physical shopping applications and experiences. As another example of coordinating and streamlining online shopping and physical shopping applications, if the shopping system 110 determines that the user dwells within a particular area of the store (e.g., within zone 514, shown in FIG. 5) for over a threshold period of time (e.g., five minutes, ten minutes, or another suitable period of time), the shopping system 110 can store interaction data associated with a physical item or type of item (e.g., footwear), and can use the online shopping engine 112 to provide recommendations for the item or type of item in a future online shopping session 140.

Figure 7:
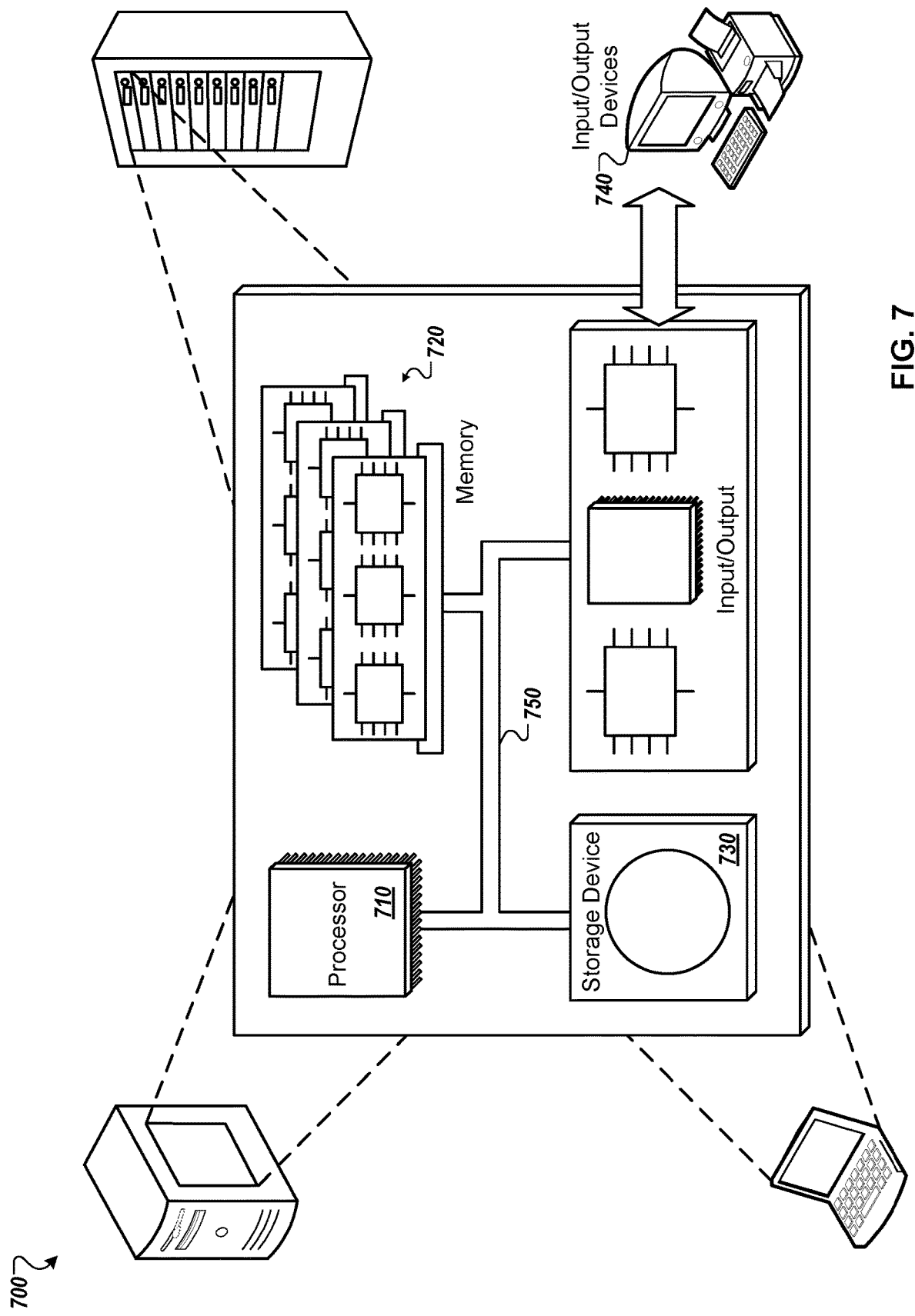
FIG. 7 is a schematic diagram that shows an example of a computing system.

FIG. 7 is a schematic diagram that shows an example of a computing system 700. The computing system 700 can be used for some or all of the operations described previously, according to some implementations. The computing system 700 includes a processor 710, a memory 720, a storage device 730, and an input/output device 740. Each of the processor 710, the memory 720, the storage device 730, and the input/output device 740 are interconnected using a system bus 750. The processor 710 is capable of processing instructions for execution within the computing system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the computing system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the computing system 700. In some implementations, the storage device 730 is a computer-readable medium. In various different implementations, the storage device 730 may be a floppy disk device, a hard disk device, an optical disk device, or a tape device.

The input/output device 740 provides input/output operations for the computing system 700. In some implementations, the input/output device 740 includes a keyboard and/or pointing device. In some implementations, the input/output device 740 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented system comprising:
   mobile computing devices configured to execute a mobile shopping application of a physical store, wherein the mobile shopping application is configured to communicate with a computer system of the physical store;
   a location determination system comprising a Bluetooth Mesh network located in the physical store, wherein the location determination system is configured to determine, for each of the mobile computing devices being operated in the physical store, a current location of the mobile computing device in the physical store;
   a point of sale device located in the physical store, wherein the point of sale device is configured to provide in-store purchase data for a point of sale engine that provides information related to purchases that occur in the physical store;
   an internet hosting server that provides data for rendering interfaces of a virtual store by an online computing device and that receives data that corresponds to user interactions with the rendered interfaces; and
   the computer system of the physical store, comprising one or more data processing apparatuses including one or more processors, memory, and storage devices storing instructions that, when executed, cause the one or more processors to perform operations comprising:
      receiving, from the internet hosting server, an indication of user interest in an item being presented to a user by an online shopping interface of the online computing device during an online shopping session at the virtual store, the indication of user interest in the item including a user identifier of the user, an item identifier of the item, and a type of user interaction with the item through the online shopping interface, wherein the type of user interaction is (i) a browsing of the item, (ii) an adding of the item to a favorites list, (iii) an adding of the item to an online shopping cart, or (iv) an adding the item to a saved for later list;
      storing data that represents the indication of user interest in the item, with data that represents indications of user interest in other items;
      receiving, through a ranking threshold control of a user preference selection interface presented by the mobile shopping application of the mobile computing device, preference data that includes a threshold ranking value for determining whether to present items to the user during a physical shopping session that occurs after the online shopping session, wherein the mobile computing device is a different computing device than the online computing device that had presented the online shopping interface;

during the physical shopping session that occurs after the online shopping session, (i) obtaining, from the mobile shopping application of the mobile computing device, the user identifier of the user, and (ii) continually obtaining, from the location determination system that determines interior locations of mobile computing devices within the physical store, the current location of the mobile computing device within the physical store;

detecting, based on the current location of the mobile computing device within the physical store, with respect to a digital map of the physical store that defines bounded areas of the physical store according to a coordinate system, that the mobile computing device has entered a bounded area of the physical store that corresponds to an entrance of the physical store;

while the mobile computing device is in the bounded area of the physical store that corresponds to the entrance of the physical store, receiving an indication from the mobile computing device that the user is currently interacting with the mobile shopping application of the mobile computing device;

in response to receiving the indication that the user is currently interacting with the mobile shopping application of the mobile computing device while the mobile computing device is located within the bounded area of the physical store that corresponds to the entrance of the physical store, triggering a process for determining whether to present a notification message related to one or more items that had been previously presented to the user by the online shopping interface of the online computing device during the online shopping session at the virtual store, wherein the process for determining whether to present the notification message comprises:

accessing the stored data that represents indications of user interest in the items, based on the user identifier obtained from the mobile shopping application of the mobile computing device;

ranking items that are available from the physical store and in which the user has expressed interest, by:

identifying a set of items in which the user has expressed interest, based on the stored data that represents indications of user interest in the items, for each item in the set of items, determining whether the item is in stock, removing out of stock items from the set of items, and for each item that remains in the set of items, assigning a corresponding ranking score, based at least in part on the type of user interaction with the item that occurred during the online shopping session using the online shopping interface, wherein (i) a high ranking score is assigned to the item in response to determining that the type of user interaction with the item was the adding of the item to the online shopping cart or the adding of the item to the saved for later list, (ii) a medium ranking score is assigned to the item in response to determining that the type of user interaction with the item was the adding of the item to the favorites list, or (iii) a low ranking score is assigned to the item in response to determining that the type of user interaction with the item was the browsing of the item through the online shopping interface, wherein when multiple different types of user interaction with the item have occurred, a highest ranking score of the scores that correspond to the types of user interaction is assigned to the item, and adjusting each ranking score according to an amount of time that has passed since the user interaction with the item occurred during the online shopping session using the online shopping interface, and according to a number of different types of user interaction that had occurred, such that ranking scores for items are increased for recent interactions and for items with which multiple different types of user interaction had occurred;

in response to determining that at least one of the items has an adjusted ranking score that meets a threshold ranking value that has previously been provided by the user of the mobile computing device through the preference selection interface, providing the notification message that includes information related to the at least one of the items, for presentation to the user through the mobile shopping application of the mobile computing device;

after providing the notification message that includes information related to the at least one of the items, detecting, based on a new current location of the mobile computing device within the physical store, with respect to the digital map of the physical store, that the mobile computing device has dwelled, for a threshold period of time, within a particular zone of the physical store that is different from the bounded area of the physical store that corresponds to the entrance of the physical store, (ii) in response to the detecting, storing physical interaction data that indicates that the user has interacted with a type of item located in the particular zone of the physical store, and (iii) providing the physical interaction data to the internet hosting server for use in providing a recommendation for the type of item through the online shopping interface of the virtual store during a future online shopping session of the user; and after providing the notification message that includes information related to the at least one of the items, (i) receiving, from the point of sale engine of the physical store, purchase information that indicates that the at least one of the items has been purchased from the physical store via the point of sale device, by the user of the mobile computing device, and (ii) in response to receiving the purchase information, updating, for each of the at least one of the items, the data that represents the indication of user interest in the item by removing the item from the online shopping cart or removing the item from the saved for later list.

2. The computer-implemented system of claim 1, wherein storing the data that represents the indication of user interest in the item includes storing, in a data structure, the user identifier of the user, the item identifier of the item, and the type of user interaction with the item through the online shopping interface.

3. The computer-implemented system of claim 1, wherein the type of user interaction with the item includes one or more of the browsing of the item through the online shopping interface, the adding of the item to the favorites list through the online shopping interface, the adding of the item to the online shopping cart through the online shopping interface, and the adding of the item to the saved for later list through the online shopping interface.

4. The computer-implemented system of claim 1, wherein detecting that the mobile computing device has entered the bounded area of the physical store includes receiving, from the mobile computing device being operated by the user, location information that indicates a location of the mobile computing device within the physical store.

5. The computer-implemented system of claim 1, wherein the mobile computing device is configured to present information associated with the ranked items.

6. The computer-implemented system of claim 5, further comprising:

in response to detecting that the mobile computing device is within an area of the physical store that is associated with a given item in the ranked items:
providing, through the mobile shopping application, a notification message that indicates that the given item is available in the physical store.

7. The computer-implemented system of claim 6, wherein the mobile shopping application is configured to present a shopping list, wherein providing the notification message that indicates that the given item is available in the physical store includes prompting the user to add the given item to the shopping list.

8. The computer-implemented system of claim 5, wherein the mobile shopping application is configured to present a shopping list, the method further comprising:

in response to determining that a given item is within a threshold distance of one or more items that are included on the shopping list, prompting the user to add the given item to the shopping list.

9. The computer-implemented system of claim 5, wherein the mobile shopping application is configured to present a shopping list, the shopping list being arranged according to an optimized path that includes a location of the mobile computing device and locations of items in the shopping list.

* * * * *